(12) United States Patent
Urrutia et al.

(10) Patent No.: US 10,661,318 B2
(45) Date of Patent: May 26, 2020

(54) PROCESS AND CONTAINER FOR SOLIDIFICATION AND DISPOSAL OF LIQUID WASTE

(71) Applicants: Jose L Urrutia, Suwanee, GA (US); William D Lewis, West Monroe, LA (US)

(72) Inventors: Jose L Urrutia, Suwanee, GA (US); William D Lewis, West Monroe, LA (US)

( * ) Notice: Subject to any disclaimer, the term of this patent is extended or adjusted under 35 U.S.C. 154(b) by 0 days.

(21) Appl. No.: 15/255,272

(22) Filed: Sep. 2, 2016

(65) Prior Publication Data
US 2017/0065959 A1    Mar. 9, 2017

Related U.S. Application Data

(60) Provisional application No. 62/283,507, filed on Sep. 3, 2015.

(51) Int. Cl.
| | |
|---|---|
| *B09B 1/00* | (2006.01) |
| *C02F 11/00* | (2006.01) |
| *E21B 21/06* | (2006.01) |
| *B01J 20/26* | (2006.01) |
| *B65B 3/04* | (2006.01) |
| *B65B 7/16* | (2006.01) |
| *B65B 63/00* | (2006.01) |
| *B65D 25/34* | (2006.01) |
| *B65D 85/00* | (2006.01) |
| *C02F 103/00* | (2006.01) |
| *C02F 103/10* | (2006.01) |
| *B01J 19/06* | (2006.01) |

(52) U.S. Cl.
CPC ............ *B09B 1/00* (2013.01); *B01J 20/26* (2013.01); *B65B 3/04* (2013.01); *B65B 7/16* (2013.01); *B65B 63/00* (2013.01); *B65D 25/34* (2013.01); *B65D 85/70* (2013.01); *C02F 11/008* (2013.01); *E21B 21/062* (2013.01); *B01J 19/06* (2013.01); *C02F 2103/005* (2013.01); *C02F 2103/10* (2013.01); *C02F 2201/008* (2013.01); *C02F 2303/02* (2013.01)

(58) Field of Classification Search
CPC ................................ B09B 1/00; B01J 19/06
See application file for complete search history.

(56) References Cited

U.S. PATENT DOCUMENTS

| | | | |
|---|---|---|---|
| 4,518,507 A * | 5/1985 | Conner | ............ B09B 1/00 141/114 |
| 4,914,170 A | 4/1990 | Chang | |
| | | (Continued) | |

FOREIGN PATENT DOCUMENTS

| | | |
|---|---|---|
| EP | 0884117 A2 | 12/1998 |
| WO | 2006/129283 | 12/2006 |

OTHER PUBLICATIONS

Extended European Search Report for EP 16187154.6 dated Feb. 8, 2017.

(Continued)

*Primary Examiner* — Janine M Kreck
(74) *Attorney, Agent, or Firm* — Baker Donelson; Carl M. Davis, II

(57) ABSTRACT

A process for the solidification of liquid waste prior to disposal in a landfill, and an impermeable container in which the liquid waste is solidified.

11 Claims, 13 Drawing Sheets

(56) References Cited

U.S. PATENT DOCUMENTS

| | | | |
|---|---|---|---|
| 5,284,621 A * | 2/1994 | Kaufman | A61L 11/00 206/524.6 |
| 5,916,122 A | 6/1999 | McClure et al. | |
| 6,686,414 B1 | 2/2004 | Anderson | |
| 6,984,419 B2 | 6/2006 | Anderson | |
| 7,438,951 B2 | 10/2008 | Anderson | |
| 8,348,056 B2 * | 1/2013 | Maness | A61M 5/3205 206/366 |
| 2002/0185156 A1 * | 12/2002 | Tanhehco | B01J 20/26 134/6 |
| 2004/0144682 A1 | 7/2004 | Altmayer | |
| 2010/0069700 A1 | 3/2010 | Brunsell et al. | |
| 2011/0301399 A1 | 12/2011 | Perlman | |
| 2012/0157745 A1 * | 6/2012 | Fenelon | C02F 1/285 588/255 |
| 2016/0251918 A1 * | 9/2016 | Dorsch | B01J 20/261 588/255 |
| 2016/0271583 A1 * | 9/2016 | Kenmore | B01J 20/26 |

OTHER PUBLICATIONS

Response to EESR filed on Sep. 8, 2017 for EP 16187154.6.
Communication from EPO dated Dec. 19, 2017 for EP 16187154.6.
Response to Examination Report dated Dec. 19, 2017 for EP 16187154.6 (dated Jun. 22, 2018).

* cited by examiner

PROCESS AND CONTAINER FOR SOLIDIFICATION AND DISPOSAL OF LIQUID WASTE

CROSS-REFERENCE TO RELATED APPLICATIONS

This non-provisional application is based upon, and claims priority to, U.S. Provisional Patent Application Ser. No. 62/283,507, filed Sep. 3, 2015.

STATEMENT REGARDING FEDERALLY SPONSORED RESEARCH OR DEVELOPMENT

Not Applicable

TECHNICAL FIELD

This invention relates to a process and container for the solidification and disposal of liquid waste. In a more specific aspect, this invention relates to a process which enables the solidified liquid waste to be placed directly in a landfill or other environmental sites.

In this application, the terms "landfill" and "other environmental sites" will be understood to include sites where waste is deposited, such as landfills, phosphogypsum stacks, environmentally impacted land, leach pads, mining spoils and other environmental sites.

In this application, the term "liquid waste" will be understood to include any residue of waste liquids which is to be deposited in a landfill. These waste liquids may include drilling fluids, septic liquids and liquid waste products from industrial and residential sites.

BACKGROUND OF THE INVENTION

The disposal of liquid waste in a landfill is an important but awkward task, because liquid waste cannot be placed directly in the working phase of the landfill. Regulations of the U.S. Environmental Protection Agency (EPA) require that, prior to placing or disposal in a landfill, liquid waste be solidified to a point that the mixed or stabilized resulting liquid waste pass the paint filter test (as defined by the method in EPA Regulation No. 9095B).

Currently, solidification of liquid waste is performed in large tanks or lined pits buried in the ground outside or inside the waste footprint of the landfill. In that way, the trucks carrying the liquid waste can back up to the edge of the tank (or pit) to dump the liquid waste into the tank. The truck driver is required to walk around and work next to the open tank as he prepares to discharge the liquid waste. Once the truck has discharged the liquid waste, then a trackhoe or backhoe with an operator is required to load one or more solidification agents in the tank for mixing. Once enough solidification agent is added, the trackhoe operator then mixes the solidification agent with the liquid waste until the solidified waste appears to pass the paint filter test. The trackhoe then loads the solidified liquid waste into another truck with a driver, which then carries the load to the working face of the landfill for final disposal and burial. The current solidification process is very slow, dangerous, messy, dusty and requires large capital equipment and labor resources.

Other problems encountered during the current solidification process are compliance issues related to odors and spills along the roads and sites prior to placement of the solidified liquid waste in the landfill.

Due to the disadvantages and issues of the current solidification process, there is a need in the industry for a process for the solidification and disposal of liquid waste which is more efficient, less expensive and safer for all concerned, and for a container in which the solidification and disposal in a landfill can occur.

SUMMARY OF THE INVENTION

Briefly described, the present invention provides a process by which liquid waste is solidified in a container at a landfill or prior to arriving at a landfill, and the container of solidified liquid waste is then placed directly into the landfill.

The present invention also provides a container in which liquid waste is solidified, after which the container of solidified liquid waste is placed directly into the landfill.

The container provided by this invention is an impermeable container preloaded with (1) a predetermined amount of one or more solidifying agents and one or more layers of a woven textile, a non-woven textile or paper inside the container, the one or more layers in contact with a predetermined amount of at least one solidifying agent and (2) an injector port for receiving an injector tube.

The process provided by this invention is generally defined as obtaining an impermeable container having an injector port preloaded with a predetermined amount of one or more solidifying agents captured by one or more layers of a woven textile, a non-woven textile or paper; injecting liquid waste into the container through the injector port; allowing sufficient time for the solidifying agent(s) to solidify the liquid waste; and then directly placing the container of solidified liquid waste into a landfill.

More particularly, the present invention provides a container for solidification of liquid waste prior to the disposal of the liquid waste in a landfill or other environmental site, wherein the container comprises:

A. an outer cover of an impermeable membrane;

B. the container further comprises a foldable textile or paper layer and preloaded with one or more layers of a woven textile, a non-woven textile or paper;

C. a predetermined amount of at least one solidifying agent captured by the one or more layers; and D. a closeable opening.

In another aspect, the present invention provides a process for the solidification of liquid waste prior to depositing the waste in a landfill or other environmental site, wherein the process comprises the steps of:

(A) obtaining a breakable container having an outer layer of an impermeable membrane and a predetermined amount of at least one solidifying agent captured by one or more layers of a woven textile, a non-woven textile or paper, preloaded within the container, wherein the container includes a closeable opening for receiving liquid waste;

(B) injecting the liquid waste into the container through the closable opening and into contact with at least one solidifying agent;

(C) permitting contact between the liquid waste and the at least one solidifying agent without mechanical mixing for a time sufficient for the liquid waste to become substantially solidified in the container;

(D) closing the closable opening;

(E) depositing the container of substantially solidified liquid waste in a landfill or other environmental site; and (F) breaking the container for flow of solidified waste into the landfill.

DETAILED DESCRIPTION OF THE INVENTION

Figure 1:
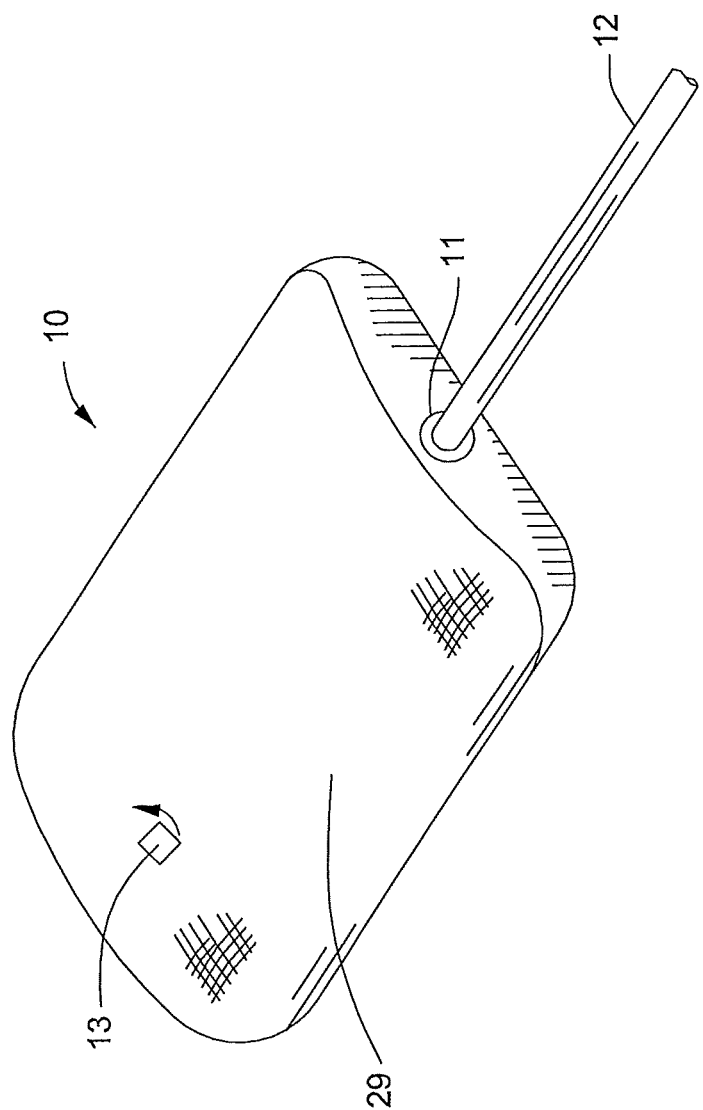
FIG. 1 is a schematic view of a container according to the present invention.

The present invention provides a process by which liquid waste is solidified in an impermeable container by one or more solidifying agents, after which the container with the solidified liquid waste can be placed directly in a landfill.

As stated earlier in this application and due to regulations of the U.S. Environmental Protection Agency, liquid waste cannot be placed directly in a landfill, but first must be solidified to pass the paint filter test and then placed in a landfill.

The solidification process must be continued until the solidified liquid waste passes the paint filter test. At one or more selected times during the solidification process, a sample of the liquid waste is extracted from the container and tested. This procedure continues, if necessary, until the sample passes the paint filter test, which indicates the container with the solidified liquid waste can be placed directly in the landfill.

Examples of the solidifying agents which can be used in this invention include those materials known as fibrous absorbents, synthetic foam absorbents, particulate absorbents, polymeric ionic absorbents, super absorbing polymers, kitty litter, vermiculate, clay, saw dust, fly ash, lime, dirt and combinations of two or more of these materials.

Preferred solidifying agents are fly ash and super absorbent polymers (also referred to as SAP), which can be in aqueous, particulate, granular, fibrous or powdered form. The term "super absorbent polymer" refers to a polymer that can absorb and retain large amounts of water or other liquids relative to the mass of that polymer.

Examples of super absorbent polymers are described in Anderson et al. U.S. Pat. Nos. 6,686,414; 6,984,419; and 7,438,951; and in Chang et al. U.S. Pat. No. 4,914,170.

A super absorbent polymer performs best when used in a free state as opposed to a confined state, as the absorption capability of the polymer is less when used in a confined state.

The outer layer of the solidification container of this invention is constructed of an impermeable membrane. Examples of suitable impermeable membranes are polyethylene, high density polyethylene, linear low density polyethylene, polyvinyl chloride, polypropylene, ethylene propylene diene terpolymer and reinforced scrim membranes. The thickness of the impermeable membrane can vary, but must be sufficient to accommodate the volume of liquid waste destined for disposal in a landfill. The thickness of the impermeable membrane can be from about 2-100 mils, preferably from about 3-10 mils.

The size of the solidification container can be varied from small to very large, depending on the volume of liquid waste to be solidified. The shape of the container can also be varied, such as a square, rectangle, circle, oblong, roundish, etc.

The container of this invention includes an injector tube having a leakproof port which functions as the interface between the injector tube and the inside of the container. The injector tube is utilized to convey the liquid waste (from a waste truck, for example) into the container, minimize the velocities of the liquid waste in the container and aid in mixing the liquid waste with the solidifying agents. The injector tube is removed from the container when the container is filled with the predetermined amount of liquid waste.

To facilitate delivery and mixing of the liquid waste in the container, the injector tube preferably has openings (or perforations) in the portion located inside the container.

The process of this invention converts the liquid waste into a sanitary solid or semi-solid in a container for direct disposal at the working face of the landfill in a safe and efficient matter that does not require mechanical mixing or environmental exposure before final disposal of the solidified liquid waste. This invention addresses the disposal difficulty by providing a convenient conversion and handling method by the use of a container placed directly into the disposal area (i.e., the working face) of the landfill. The solidifying agents are introduced into the impermeable container which provides substantially constant volume absorption ("isovolumic absorption") and conversion to minimize the risk of spillage of the liquid waste.

The absorbent properties of the solidifying agent and the size and configuration of the container allow for a safe and convenient handling of the liquid waste. Furthermore, the swelling character of the solidifying agent is important, because swelling allows proper absorption to take place in the container without requiring the solidifying agent to be agitated by mechanical means other than with contact with the incoming liquid waste.

The container of this invention has a leakproof port on one end for the introduction of the injector tube (preferably a perforated tube) which is designed to penetrate the leakproof port and perform as an injector of the liquid waste into the container. The injector tube disperses and regulates the liquid velocity and evenly disperses (mixes) the liquid waste within the container and conveys the liquid waste from the truck tank into the container.

Since super absorbent polymers can absorb and solidify liquids many times their own weight, these solidifying agents meet the general objectives of the U.S. Environmental Protection Agency and landfill sites to minimize the amount of waste and obviate the need of using large quantities of bulk, dusty absorbents to dewater and/or solidify aqueous wastes. Solidifying agents that rely upon chemical reaction, such as fly ash and cement, can be used with the process of this invention, as well as other absorbents that create a more bulky residue. These bulking agents, such as sawdust, sanders dust, rice hulls, etc., can be inserted into the container via air pumps and conveyors prior to introducing the liquid waste.

The super absorbent polymers and other solidification agents can be introduced into the container by using one or more pre-measured pouches that will dissolve upon contact with the liquid waste. The pre-measured volumes are designed to be capable of solidifying a volume of liquid waste equal to the volume of the capacity of the container.

In view of the foregoing, the present invention provides for a sanitary package of solidification agents, delivery, mixing and disposal process where the impermeable container provides for solidification of a known volume of liquid waste without having to measure and handle the solidifying agents. Alternatively, the container also provides for the use of more bulky solidifying agents.

The total absorbency and swelling capacity of the solidifying agent are factors to be considered, specifically with cross-linking polymers. Lower density cross linking results in higher absorbance capacity and a greater degree of swelling, but also tends to exhibit a softer and more cohesive gel formation. Alternatively, higher cross-linking levels generally result in lower absorption capacity and swelling, but with a stronger mixing gel, which can maintain particle shape when subjected to the normal pressures exerted by the landfill daily covers. Fly ash performs a chemical reaction that solidifies and binds the liquid waste which becomes very hard.

The use of super absorbent polymers (the preferred solidifying agent), fly ash or other solidifying agent(s) in the solidification container of this invention in landfill applications is of upmost importance in any landfill due to the importance to conserve permitted airspace. For example, this invention, through the use of the impermeable container with SAP and/or fly ash, can reduce the airspace consumed in the landfill in the solidification process by a factor of 4:1 in volume when compared to the use of other absorbing agents (i.e., sawdust, rice hulls, sanders dust, etc.). There is a less than a 1% volumetric increase of solidified liquid waste when using SAP and/or fly ash solidifying agents with the process of this invention. With this invention, the landfill owner or operator will conserve airspace in the landfill.

The solidifying agent(s) are preferably (a) placed directly into the solidification container of this invention or (b) placed directly into a bag (i.e., a pouch) which is later placed into the solidification container. In either method, the solidifying agent(s) will come into contact with the liquid waste, resulting in solidified liquid waste.

With this invention, the bag(s) of solidified liquid waste can be transported to a landfill by any suitable conveyance, such as with a typical dump truck or with a truck having a rolloff container.

Alternatively, the liquid waste can be transported by truck to a landfill where the process and container of this invention can, be used to solidify the liquid waste in the truck prior to disposal in the landfill.

Alternatively, a solidification container having only the solidification agent(s) can be placed directly in the working face of a landfill, and the liquid waste can be pumped from the truck into the container.

Alternatively, the bed of the truck used to transport the liquid waste to a landfill can be used as the location for the process and container of this invention to solidify the liquid waste. In other words, the liquid waste can remain in the truck bed until the solidified passes the paint filter test and can then be deposited in the landfill.

The pouch, when used with the chemical reactive solidifying agents becomes a very large dust suppressant (air filter) during the introduction of the material into the bag and pouch. The material is typically moved from a tanker with compressed air. Reducing airborne particulate is important due to both the dusty nature and exposure hazards associated with these type solidifying agents. The pouch will be manufactured differently for this application. The pouch will be one or more layers of woven/non-woven textiles sealed around the edges for air containment and open throughout the pouch (like a huge sleeping bag). This allows the solidifying agent to be introduced into the pouch, while the dust is captured within the textile. The injection port can be used for both the solidifying agent as well as the liquid waste. In some cases, because of the chemical reaction of some of the solidifying agents mentioned, heat can be generated during the solidifying process as a result of the chemical reactions, the bag should be manufactured of material capable of handling these temperature increases.

With this invention, the container of solidified liquid waste can be placed directly on the working face of a landfill. Normal operations at landfills involve the placement of daily soil covers to minimize odors and vectors. The container of solidified liquid waste will generally be covered with layers of other wastes and 6 to 12 inches of soil at the end of the day, and the resultant pressures will intentionally break the solidification container. At that time, the solidifying agents with a volume of solidified waste will flow in the overall waste mass under the pressure of the other waste and daily cover, thus creating one or more friction-less balls that will increase the overall compaction of the landfill and increase airspace by filling the voids of regular trash solid waste materials. An advantage of the solidification container after being broken is to create lubrication of the waste mass which increases compaction of the waste, thereby creating additional airspace for the useful life of the landfill.

The ability of super absorbent polymers to both absorb under pressure and to retain absorbed liquids at high pressures in the landfill (i.e., more than 70 psi) will not leach under the landfill pressures and will not impact the leachate characteristics of the landfill, which could create compliance problems at a publically owned water treatment facility.

Fly ash used with this process of this invention also performs similarly in regard to the mitigation of the leaching characteristics of the solidified liquid waste.

On the outside slope areas of a typical landfill that may receive large volumes of liquid wastes and sludges, this invention could use fly ash or cement to solidify the liquid waste within the container and create a stronger mix that provides stability on the slopes of the landfill that can be as steep as 3H:1V, thereby creating firmness and stability to the outside slope areas of the landfill.

Preferred configurations of the solidification container of this invention are shown in the drawings of this application.

Referring now to the drawings, in which like numbers represent like elements, FIG. 1 shows a solidification container 10 having an injector tube 12 with an injection port 11 which is leakproof due to a rubber gasket or other closure device (not shown). The container 10 has a sample port 13 which can be closed after being opened so that a sample of the liquid waste being solidified can be removed for the paint filter test.

Figure 2:
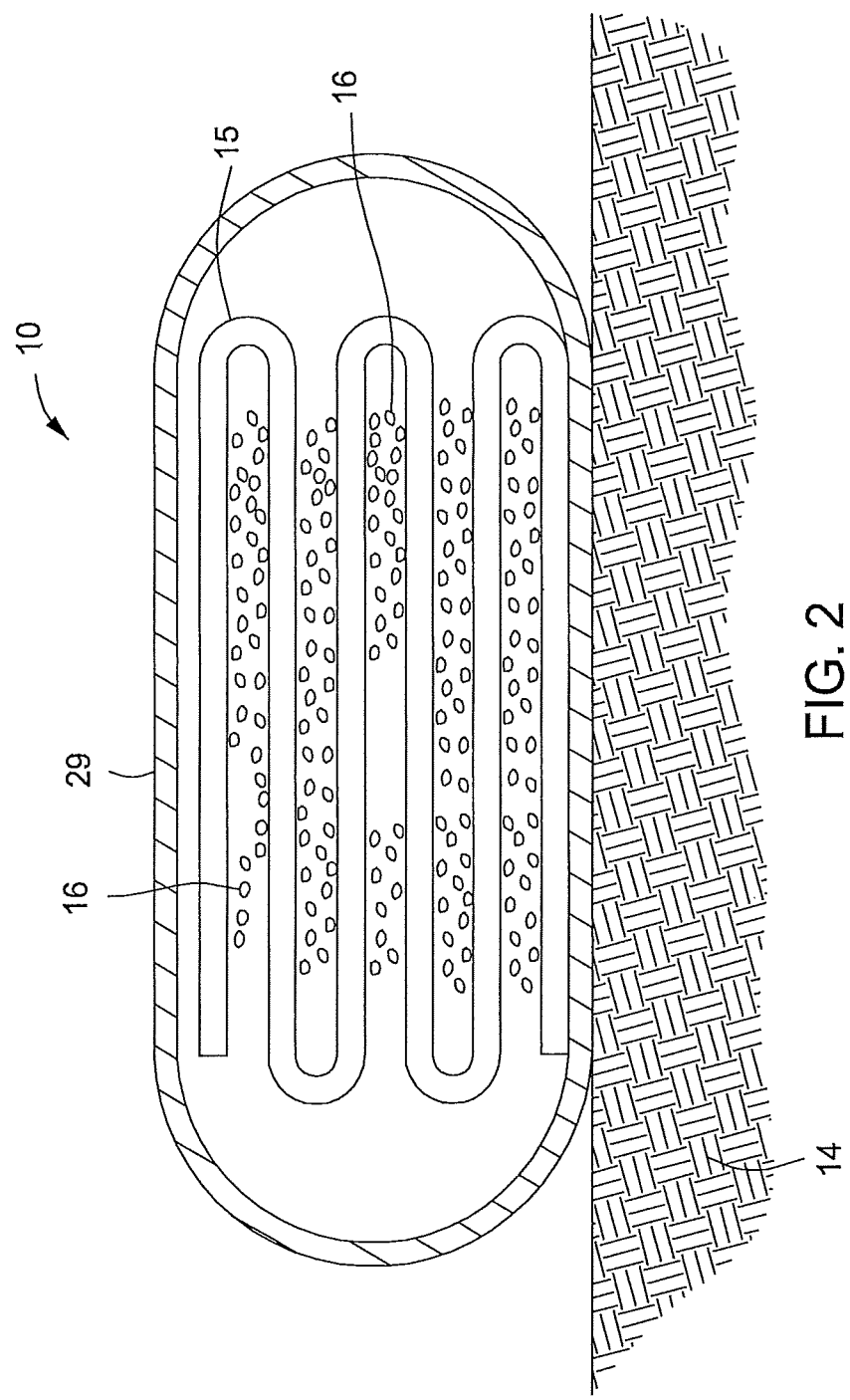
FIG. 2 is a cross-sectional view of an embodiment of a container according to the present invention.

FIG. 2 shows an embodiment in which the container 10 has a layer 15 of woven or non-woven fabric which encases the solidifying agent(s) 16. The container 10 is shown at the working face of a landfill 14.

Figure 3:
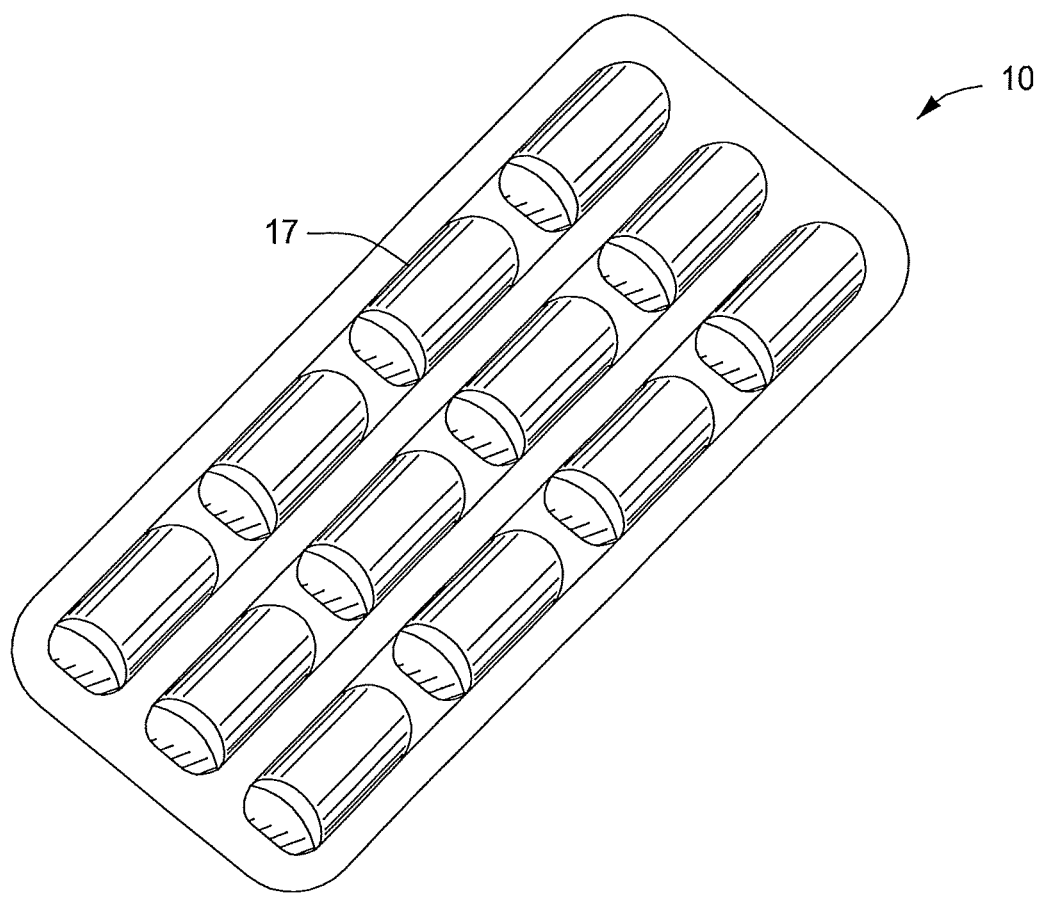
FIG. 3 is a top view of a container (shown open) having multiple pouches according to an embodiment of the present invention.

FIG. 3 shows another embodiment of the container 10 in which a multiple of pouches 17 of the solidifying agent (not shown) are within the container 10.

Figure 4A:
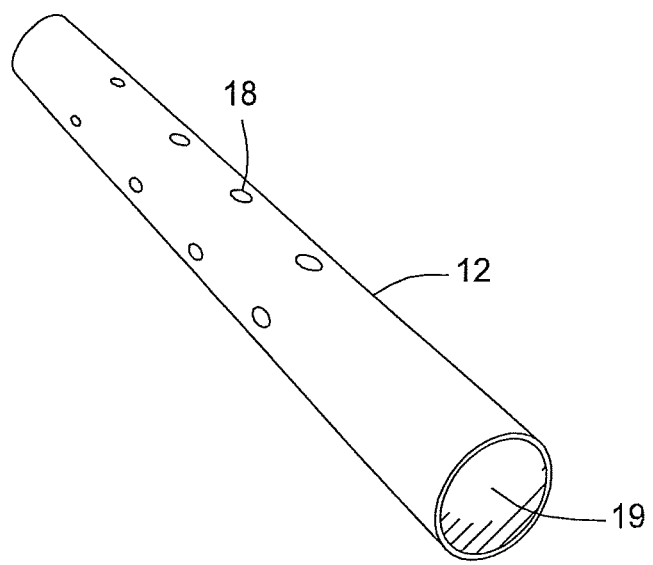
FIGS. 4A & B show an injector tube and sample port of a container according to the present invention.
Figure 4B:
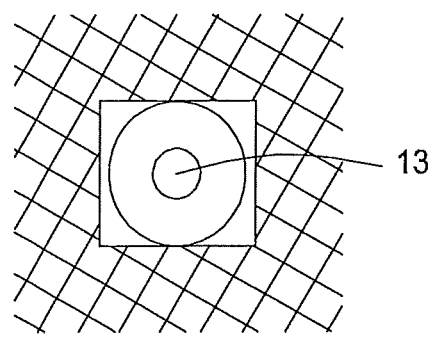

FIG. 4 shows the injector tube 12 with openings 18 (or perforations) to dispense and mix the liquid waste in a container (not shown). The injector tube 12 is shown with a closed end 19, with the opposite end being open.

Figure 5:
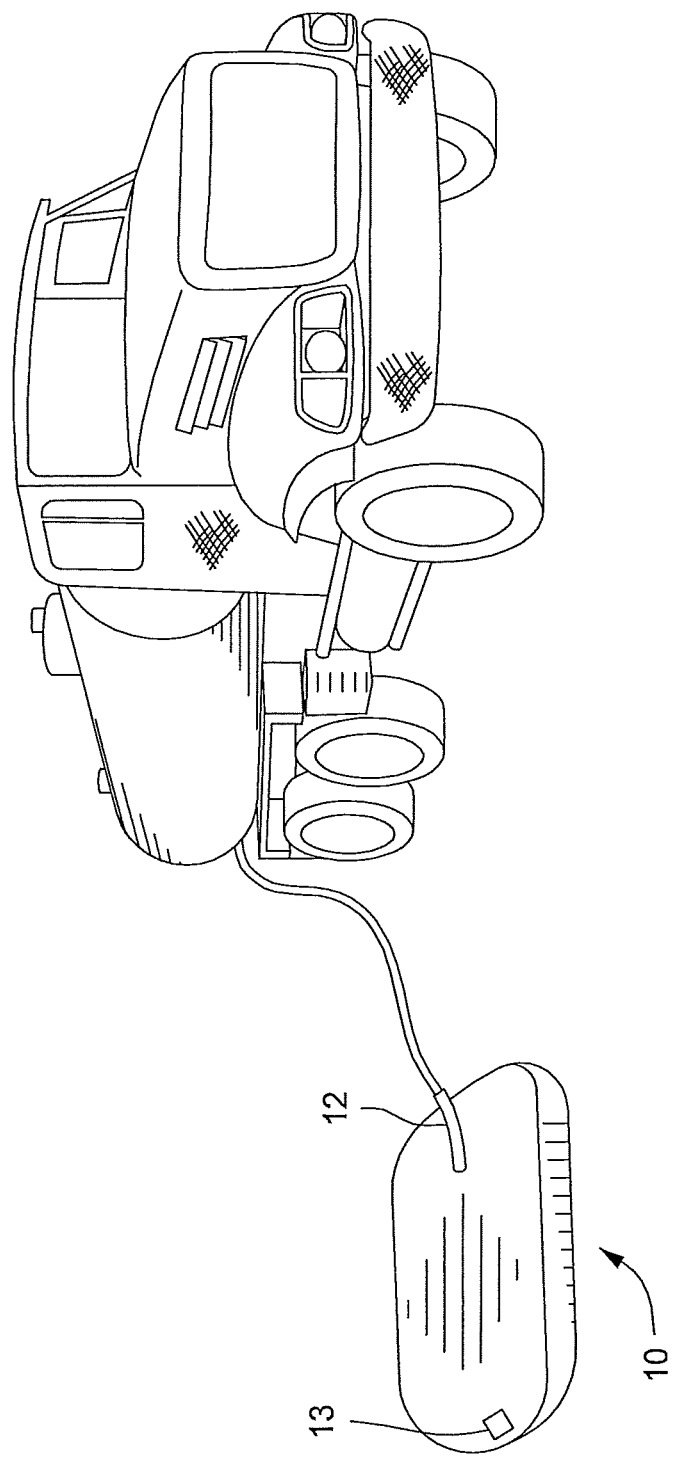
FIG. 5 is a depiction of a truck delivering liquid waste to a container according to the present invention.

FIG. 5 shows a typical dump truck delivering liquid waste through the injector tube 12 to the container 10 which has a sample port 13.

Figure 6:
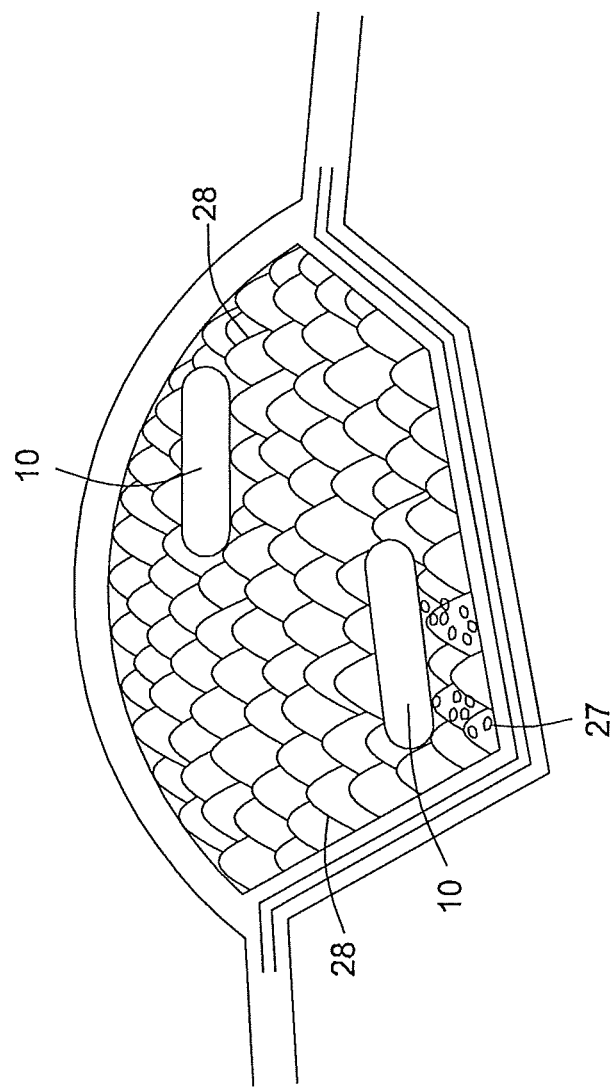
FIG. 6 is a cross-sectional view of an embodiment of a section of a typical landfill having two solidification containers according to the present invention.

FIG. 6 shows a section of a typical landfill having two solidification containers 10, solid waste 28 (i.e., trash) inside the landfill and friction-less balls 27 created by breaking of the container 10. These friction-less balls 27 lubricate and increase compaction of the solid waste 28, which increases the airspace of the landfill.

Figure 7:
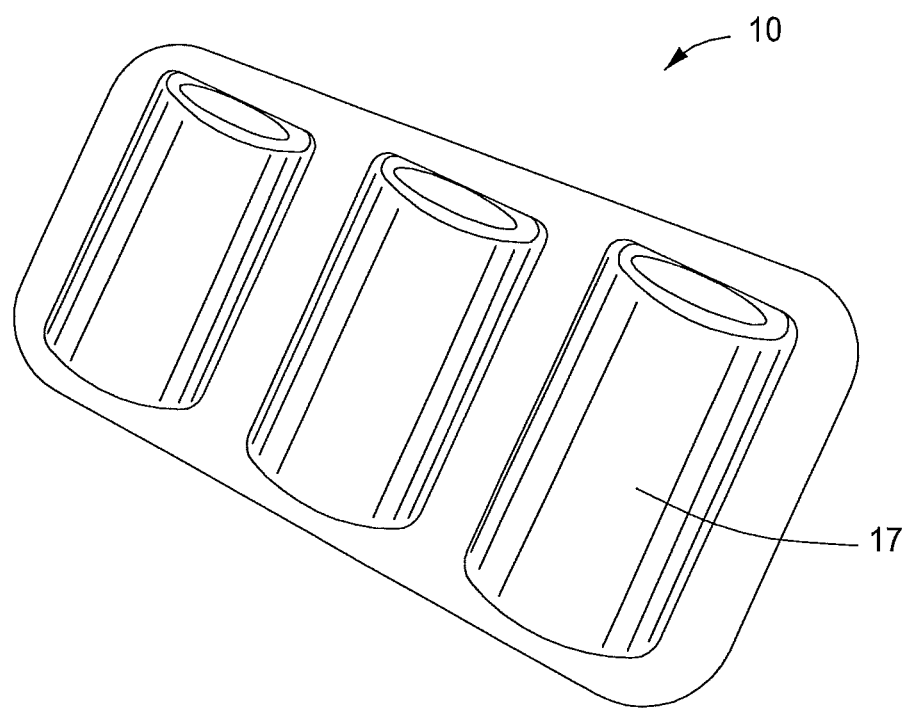
FIG. 7 is a top view of a container (shown open) having multiple pouches according to an embodiment of the present invention.

FIG. 7 shows another embodiment in which the solidification container 10 has multiple pouches 17 in a parallel relationship.

Figure 8:
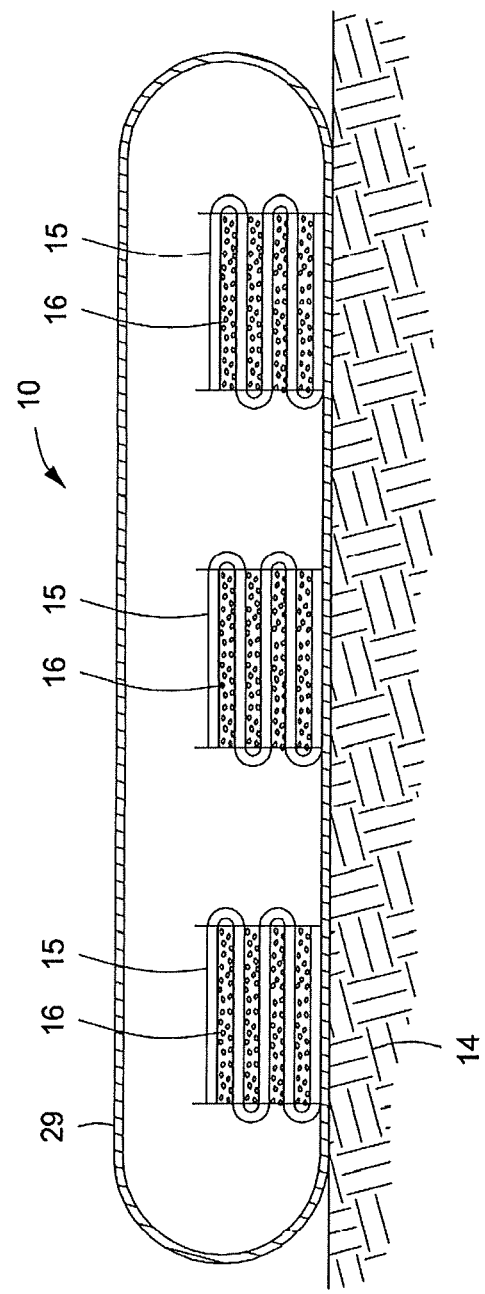
FIG. 8 is a cross-sectional view of a container according to an embodiment of the present invention.

FIG. 8 shows an alternative configuration of the container 10 having multiple pouches 17 with solidifying agents 16 with textile layer 15 in an accordion style manner. The container 10 is shown on a landfill 14.

Figure 9:
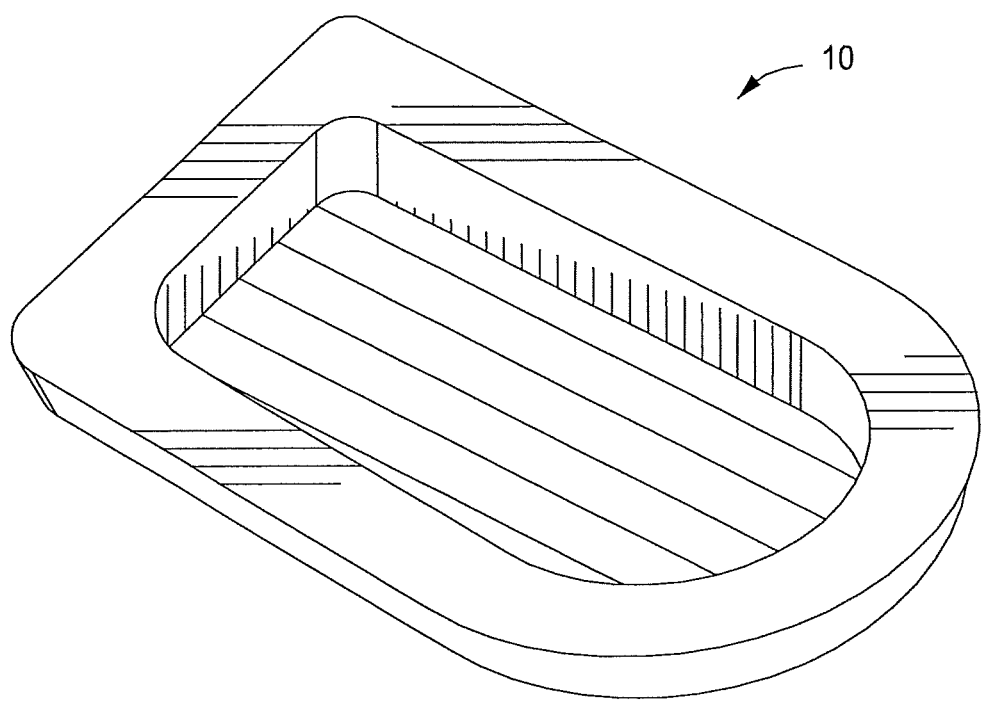
FIG. 9 is a top view of an alternate configuration of a solidification container 10 (shown open) according to this invention.

FIG. 9 shows an alternative configuration for container 10.

Figure 10A:
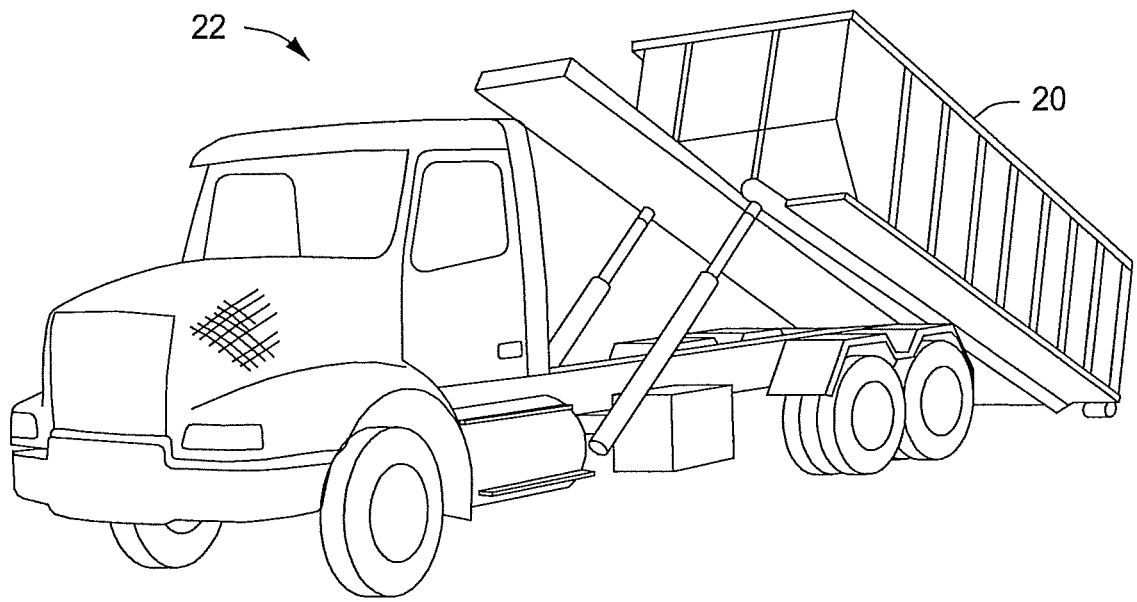
FIG. 10A is a view of a typical dump truck having a portable bulk receptacle and means for tilting the receptacle for unloading of the contents of the receptacle.

FIG. 10A shows a typical dump truck 22 having a bulk receptacle 20 for holding containers of solidified liquid waste (not shown) and means 21 for tilting receptacle 20 for unloading the containers of solidified liquid waste (not shown) from receptacle 20.

Figure 10B:
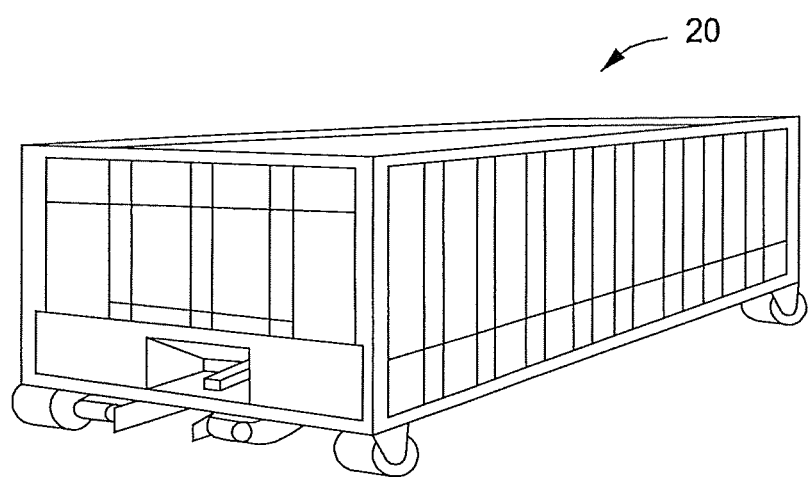
FIG. 10B is a view of a portable rollable bulk receptacle into which solidified liquid waste can be placed.

FIG. 10B shows a portable rollable bulk receptacle 20 which can be used in conjunction with truck 22 shown in FIG. 10A.

Figure 11:
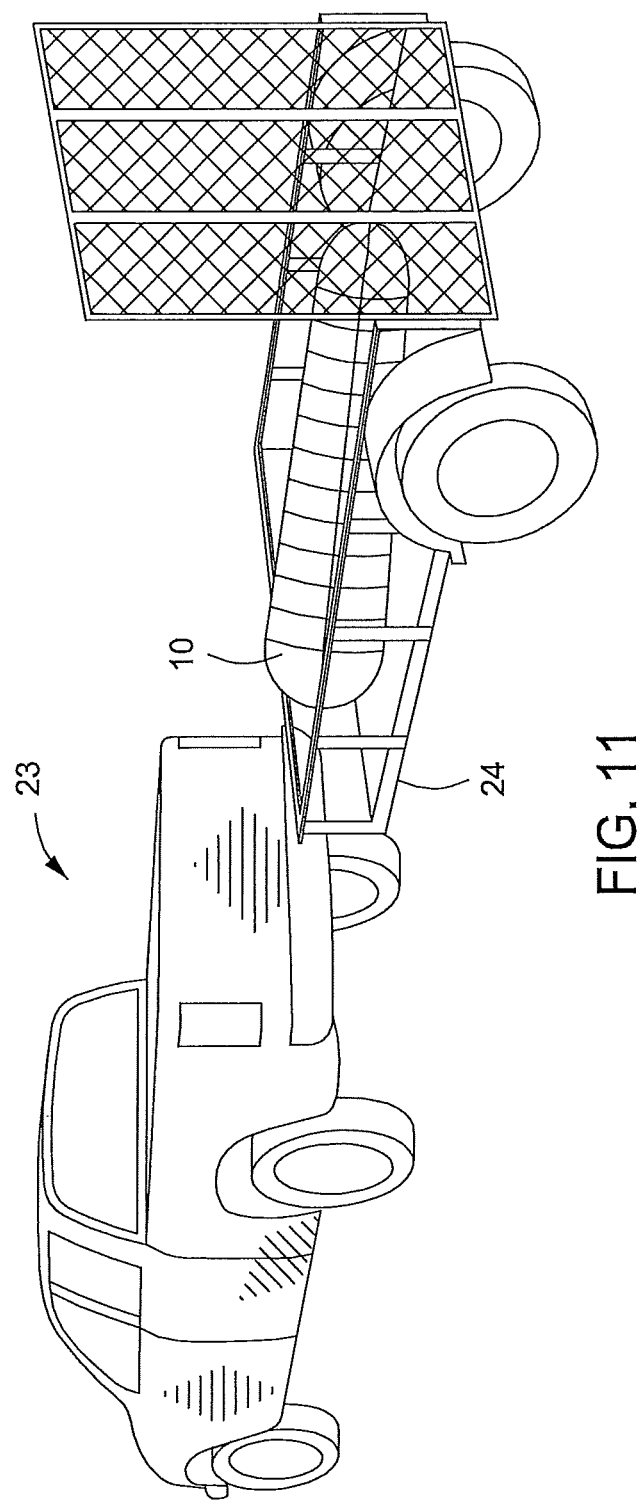
FIG. 11 is a view of an alternative for transporting containers of solidified liquid waste to a landfill.

FIG. 11 shows an alternative truck 23 having a trailer 24 for carrying one or more containers 10 of solidified liquid waste to a landfill.

Figure 12A:
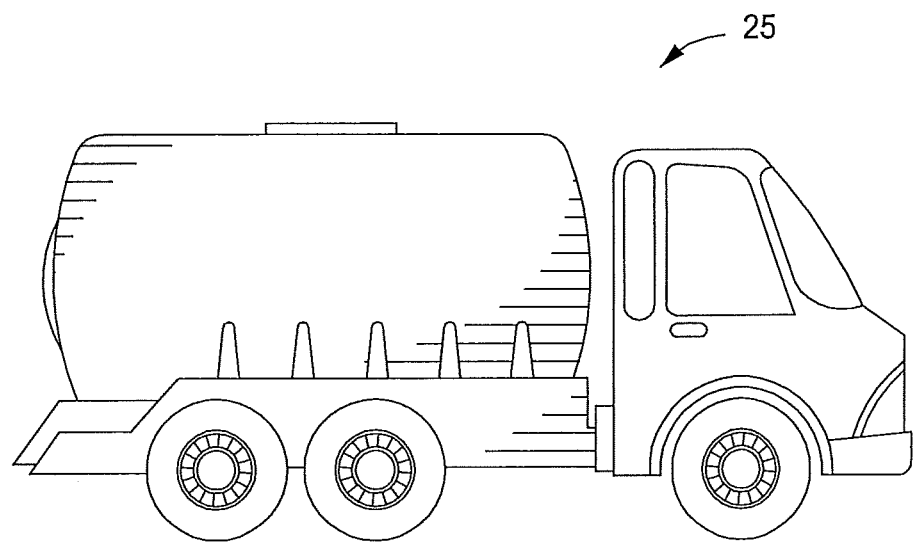
FIGS. 12A and 12B are views of alternative trucks for transporting solidified liquid waste to a landfill.

FIG. 12A shows an alternative truck 25 for carrying containers of solidified liquid waste (not shown) to a landfill.

Figure 12B:
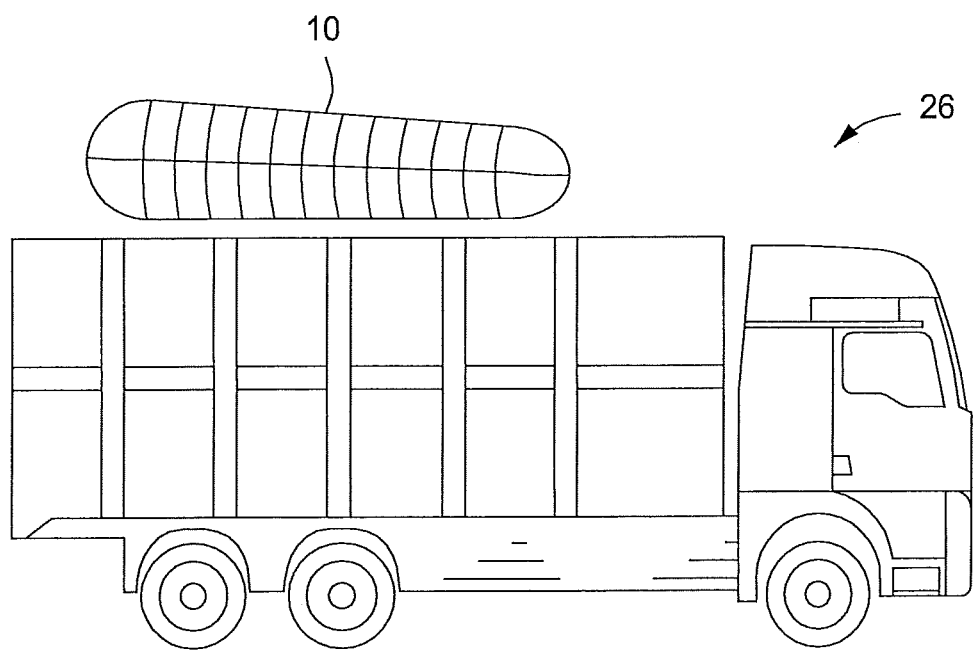

FIG. 12B shows an alternative truck 26 for carrying containers 10 of solidified liquid waste to a landfill.

Figure 13A:
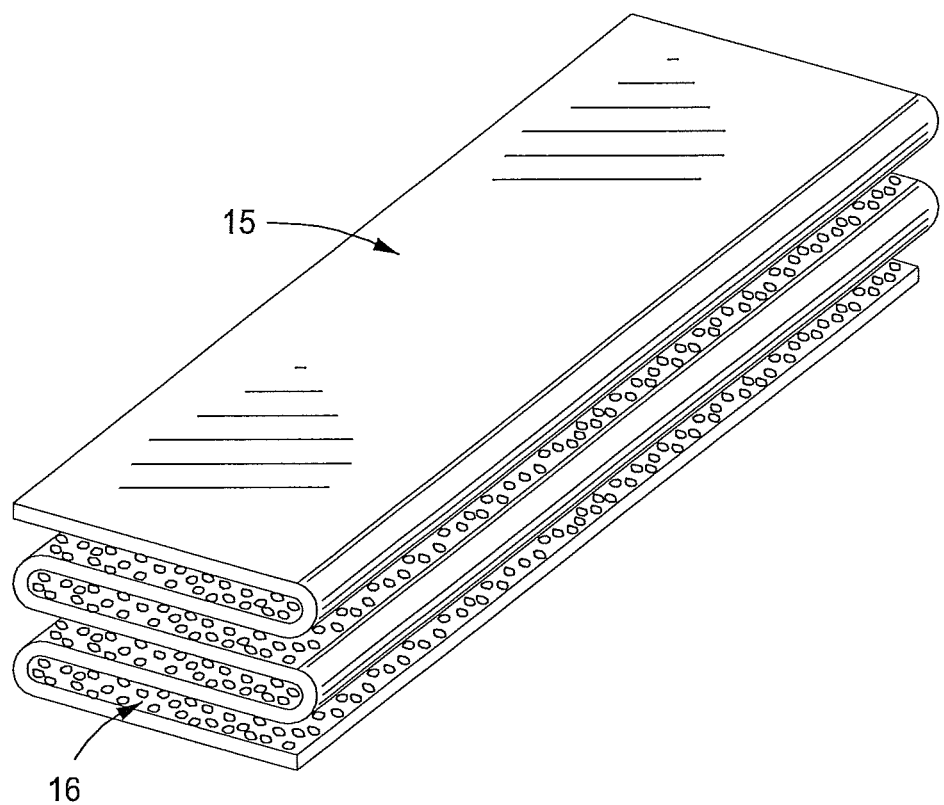
FIG. 13A shows the layer 15 of textile encasing the solidifying agents 16 in an accordion style manner with the impermeable membrane 29.

FIG. 13A shows the layer 15 of textile with the impermeable membrane 29.

Figure 13B:
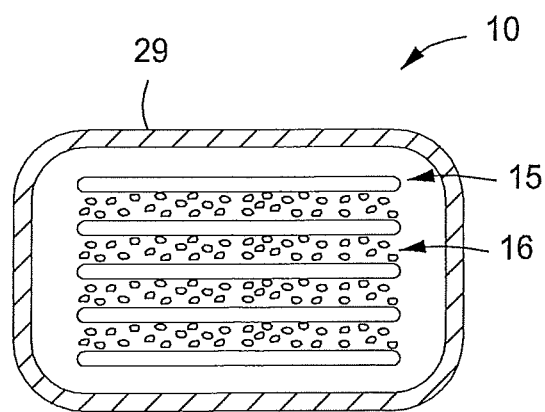
FIG. 13B is a cross section of the view shown in FIG. 13A with a cutaway view of an end portion showing the solidification agents 16.

FIG. 13B shows a cross section of the view in FIG. 13A with a cutaway view of an end portion showing the solidification agents 16.

The solidification container of this invention with an outer layer of an impermeable membrane can be constructed to hold liquid waste in large quantities, such as 500 gallons to 4,500 gallons or more. The container is preloaded with the solidifying agents and, if desired, various additives such as odor absorbents and/or scent additives.

The container of this invention may be foldable to accommodate storage and transport of multiple containers to the actual working face of the landfill. The container may include an inner liner coating to improve impermeability. Additional protective geotextile cushion layers can be placed below the container to reduce the possibility of puncture from other bulk waste materials.

The solidification container (or pouch) at least similar of this invention is preferably manufactured using one or more layers of a woven textile, a non-woven textile and/or paper. The paper layer(s) preferably have a strength at least similar to a paper towel.

In an embodiment using super absorbent particles and before the particles are placed in the container or pouch the primary textile layer is sprayed with a very light mist of water, after which the secondary textile layer is sprayed with a very light mist of water. The super absorbent particles are then placed in the pouch in contact with the primary layer and the secondary layer which overlays the primary layer. The hydration prevents the super absorbent particles from mobilizing (aggregating) within the pouch. After placement of the particles, the layers of the pouch are lightly pressed together to complete the laminated process.

The textile layers of the pouch are preferably folded in an accordion style manner as shown in FIG. 13A, instead of a rolled up folded manner. This ensures the pouch is not confined by the swelling of the particles from the hydration process. The accordion style folding will allow the pouch to swell without confinement. The textile layer(s) can also be placed in single layer fashion as shown in FIG. 13B.

Alternatively, the pouch can be closed by a needle-punching method. Use of a needle punching method to close the pouch will also promote adhesion of the solidifying agents to the textile layer and avoid movement of the solidifying agents when the pouch is transported.

The solidifying agent(s) may be selected from a solidifying agent, an absorbing agent and a combination of one or more solidifying agents and absorbing agents.

The container is disposable with an intended life of one use.

A perforated pipe with a capped end is used to convey the liquid waste from a waste truck into the container. When using a super absorbent polymer as the solidifying agent, the perforated pipe may not be required.

The injector tube is designed to be inserted into the container for this invention through the leakproof port.

The injector tube's perforations allow the liquid waste to flow evenly into the container and aid in the mixing of the solidifying agents in the solidifying process. The perforations on the injector tube diminish the velocity of the liquid waste as the liquid waste is being conveyed into the container, minimizing the stress and pressures upon the container during the loading process of this invention. The injector tube is removed from the container once the container is full and before the solidifying process is complete. The leakproof port allows the injector tube to be inserted into the container while maintaining a tight seal to prevent leakage of the incoming liquid waste.

The leakproof port can be made of a neoprene material with an orifice designed to be smaller in diameter than the injector tube, so the neoprene material will expand to accept a larger diameter injector tube with a tight seal.

The leakproof port has a flap (such as constructed from a polymer, hook-and-loop material, etc.) to prevent leakage after removal of the injector tube and before the solidifying process is complete.

The process of this invention accommodates the use of slower reactive solidifying agents, such as fly ash, since each container encapsulates the waste until the process is complete. Thus the container of this invention allows the solidification process adequate time to react with the liquid waste while the liquid waste is held in the impermeable container, thus complying with environmental regulations.

The process of this invention reduces odors associated with liquid waste through encapsulation of the liquid waste by the solidifying process.

The process of this invention reduces odors associated with liquid waste after the solidifying process and during final placement in a landfill by the use of optional odor absorbents/scent additives in the container.

Aspects of the Invention

The use of a solidification container at the working face of a landfill to solidify liquid wastes using super absorbent polymers to reduce the volume of airspace within a landfill as a result of a minimal 1% volumetric increase after the liquid waste is solidified.

Liquid waste solidified with super absorbent polymers becomes cellular and viscous in nature, which allows the solidified particles to gravitate in the natural void areas within the waste mass of the landfill to further increase compaction of the trash and the airspace in the landfill.

Super absorbent polymers minimize the leaching characteristics of the solidified liquid waste to reduce the loading and treatment costs of the leachate treatment process of the landfill and can produce an antiseptic effect in the leachate.

The process of this invention allows for the use of commonly used solidifying agents.

A lightweight, easily deployable impermeable solidification container capable of holding liquid waste in large quantities (500 gallons to 4,500 gallons or more) during a solidification process.

The solidification container has a predetermined volume of solidifying agent(s) to accommodate the volume of liquid waste introduced, so that the solidified liquid waste can pass a paint filter test.

The solidification container has a leakproof port (e.g., constructed of neoprene) on one end that is a manufactured component of the container for the purpose of allowing the injector tube to be placed within the container during conveyance of the liquid waste from the disposal truck to the container. The leakproof port is designed with an orifice smaller in diameter than that of the injector tube. The expansive nature of the port allows the larger diameter injector tube to slide through the port orifice while maintaining a leakproof interface during conveyance of the liquid waste into the container.

The solidification container is disposable, because the container with the solidified liquid waste is placed within a landfill, and the container has an intended life cycle of one use.

The process of this invention preferably uses a perforated injector tube to convey the liquid waste from the disposal truck through the leakproof port and into the container. The injector tube is perforated ¾ of the length with a cap on the perforated end. The remaining ¼ length is a solid tube to accommodate the connection from the disposal truck and maintain a seal through the leakproof port. The injector tube minimizes the liquid velocities within the container as the liquid waste is being conveyed into the container, thereby minimizing the stress and pressures upon the container as well as evenly dispersing the liquid waste and aids in the mixing during the solidification process.

The process of this invention accommodates the use of slower reactive solidifying agents, such as fly ash and cement, since each container encapsulates the waste liquids until the solidification process is complete, and each container is a separate disposable unit that does not need to be unloaded or dumped before more liquid waste can be processed for solidification.

The efficiency of the impermeable solidification container is demonstrated when the pouch contains a super absorbent polymer as the solidifying agent because the volumetric disposal is no more than 2-3 percent of the original volume of the liquid waste being solidified.

The dimensional stability and strength of the solidification container are increased when the layers are arranged in an accordion style manner.

When super absorbent polymers are used as the solidifying agents, the surface area where these agents contact the liquid waste is increased if the layers are arranged in an accordion style manner because the liquid waste can permeate through the permeable textile layers.

The efficiency of the process of this invention allows for one or more waste trucks offloading at one time as the landfill has space to accommodate the trucks.

The process of this invention reduces spills by providing an encapsulated solidification process.

The process of this invention reduces odors associated with liquid waste with a combination of both total encapsulation and optional odor absorbents/scent additives.

With the process and container of this invention, solidified liquid waste can be transported directly to the landfill instead of using tank trucks as vacuum trucks.

This invention has been described with particular reference to certain embodiments, but variations and modifications can be made without departing from the spirit and scope of the invention.

The invention claimed is:

1. A process for the solidification of liquid waste prior to depositing the waste in a landfill or other environmental site, wherein the process comprises the steps of:

(A) obtaining a breakable container having:
an outer layer of an impermeable membrane, and
a predetermined amount of at least one solidifying agent captured by one or more layers of a woven textile, a non-woven textile or paper preloaded within the container,
wherein the container includes a closeable opening for receiving a volume of liquid waste;

(B) injecting the liquid waste into the container through the closable opening and into contact with the at least one solidifying agent;

(C) permitting contact between the liquid waste and the at least one solidifying agent without mechanical mixing for a time sufficient for the liquid waste to become substantially solidified in the container;

(D) closing the closable opening;

(E) depositing the container of substantially solidified liquid waste in a landfill or other environmental site; and (F) breaking the container for flow of solidified waste into the landfill.

2. The process as defined by claim 1 wherein the solidifying agent is selected from fibrous absorbents, synthetic foam absorbents, particulate absorbents, polymeric ionic absorbents, super absorbing polymers, kitty litter, vermiculate, clay, saw dust, fly ash, lime, dirt, cement and a combination of two or more of these agents.

3. The process as defined by claim 1, wherein the solidifying agent is a super absorbent polymer.

4. The process as defined by claim 1, wherein the solidifying agent is fly ash.

5. The process as defined by claim 1, wherein the solidifying agent is a combination of a super absorbent polymer and fly ash.

6. The process as defined by claim 1, wherein the outer layer of the solidification container is impermeable and comprises polyethylene, high density polyethylene, linear low density polyethylene, chlorosulfonated polyethylene synthetic rubber, polyvinyl chloride, polypropylene, ethylene propylene diene terpolymer or a reinforced scrim membrane.

7. The process as defined by claim 1, wherein at least one solidifying agent is in a bag or pouch located within the container.

8. The process as defined by claim 1, wherein the container has a square, oval, rectangular, circular, oblong or roundish shape.

9. The process as defined by claim 8, wherein the container is rectangular.

10. The process as defined by claim 1, wherein the closeable opening is part of an injector tube.

11. The process as defined by claim 10, wherein the injector tube has one or more perforations.

\* \* \* \* \*